(12) United States Patent  
Kuwajima (10) Patent No.: US 7,391,307 B2
(45) Date of Patent: Jun. 24, 2008

(54) TIRE ALARM DEVICE (75) Inventor: Masatoshi Kuwajima, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 224 days.

(21) Appl. No.: 10/552,827

(22) PCT Filed: Apr. 14, 2004

(86) PCT No.: PCT/JP2004/005290

§ 371 (c)(1),
(2), (4) Date: Oct. 7, 2005

(87) PCT Pub. No.: WO2004/091943

PCT Pub. Date: Oct. 28, 2004

(65) Prior Publication Data

US 2006/0208863 A1    Sep. 21, 2006

(30) Foreign Application Priority Data

Apr. 15, 2003    (JP)    ................ 2003-110453

(51) Int. Cl.
*B60C 23/00*    (2006.01)
(52) U.S. Cl. ................ 340/442; 73/146; 152/152.1
(58) Field of Classification Search ......... 340/442–448; 73/146, 146.5; 152/152.1
See application file for complete search history.

(56) References Cited

U.S. PATENT DOCUMENTS

| 6,259,361 | B1 | 7/2001 | Robillard et al. |
| 2005/0076992 | A1* | 4/2005 | Metcalf et al. ........... 156/110.1 |
| 2006/0093015 | A1* | 5/2006 | Ichihara et al. ........... 374/45 |

FOREIGN PATENT DOCUMENTS

| JP | 62-87816 A | 4/1987 |
| JP | 6-211012 | 8/1994 |
| JP | 6-297922 A | 10/1994 |
| JP | 7-52618 | 2/1995 |
| JP | 9-136517 | 5/1997 |
| JP | 2000-355203 | 12/2000 |
| JP | 2003-508299 A | 3/2003 |
| JP | 2003-159918 A | 6/2003 |
| JP | 2003-220810 A | 8/2003 |
| WO | WO-02/07996 | 1/2002 |
| WO | WO-2004/014671 A1 | 2/2004 |

OTHER PUBLICATIONS

International Search Report.

* cited by examiner

*Primary Examiner*—Davetta Goins
*Assistant Examiner*—Hongmin Fan
(74) *Attorney, Agent, or Firm*—Greer, Burns & Crain, Ltd.

(57) ABSTRACT

A tire alarm device gives a warning against the runflat operation limit of a pneumatic tire during runflat operation, the tire having a reinforcement layer disposed in each sidewall thereof for enabling the runflat operation. The device includes a tire temperature sensor used to warn of the runflat operation limit, and the tire temperature sensor is disposed on the inner surface of one of the sidewalls facing the reinforcement layer therein.

6 Claims, 5 Drawing Sheets

TIRE ALARM DEVICE

The present application claims priority based on Japanese Patent Application No. 2003-110453, filed Apr. 15, 2003, the entirety of which is being incorporated herein by reference.

TECHNICAL FIELD

The present invention relates to a tire alarm device that gives a warning against the runflat operation limit of a pneumatic tire during runflat operation, and more particularly, to a tire alarm device that can warn of the runflat operation limit with high accuracy.

TECHNICAL BACKGROUND

In response to demands in the market, there have been proposed many technologies which allow a vehicle to urgently travel (travel in a runflat mode) several hundred kilometers even when the pneumatic tire is punctured while running; in recent years, safety tires and tire/wheel assemblies in which such technologies were put into practical use are gradually prevailing. Even when the inner pressure of the safety tires or tire/wheel assemblies decreases due to, for example, puncturing, it is not easy to find the decrease in the tire inner pressure apparently; therefore, the safety tires and tire/wheel assemblies are required to be used in conjunction with an apparatus for monitoring the tire condition because of assuring safety thereof.

As a conventional apparatus for monitoring the condition of a tire, Japanese Patent Application Publication No. 6-211012, for example, discloses a tire condition monitoring apparatus having an air pressure detecting means for detecting the air pressure of a tire, a temperature detecting means for detecting the temperature of a tire, and a burst generation prediction means for predicting the generation of burst of a tire based on the air pressure detected by the air pressure detecting means and the tire temperature detected by the temperature detecting means. Japanese Patent Application Publication No. 2000-355203 discloses a tire air pressure warning apparatus that detects the air pressure of a tire with a pressure sensor to inform the vehicle side of it by radio.

The above-described apparatuses can suitably be used as apparatuses for monitoring the condition of a normal pneumatic tire mounted on a vehicle; however, when the above apparatuses are used for the foregoing safety tires or tire/wheel assemblies, they can not give the driver a warning against the limit of runflat operation (the limit where the operation is stopped before the breakdown of the tire) with high accuracy during runflat operation.

DISCLOSURE OF THE INVENTION

An object of the present invention is to provide a tire alarm device which can warn the driver of the limit of runflat operation with high accuracy during runflat operation.

In order to achieve the above object, the present invention provides a tire alarm device that gives a warning against a runflat operation limit of a pneumatic tire during runflat operation having a reinforcement layer disposed in each sidewall thereof for enabling the runflat operation, comprising a tire temperature sensor to be disposed on an inner surface of one of the sidewalls facing the reinforcement layer therein, the tire temperature sensor being used to warn of the runflat operation limit.

A pneumatic tire having a reinforcement layer disposed in each sidewall for enabling runflat operation does not allow for runflat operation when the reinforcement layer that supports the load during runflat operation is heated and destroyed; as described above, because the tire temperature sensor is placed on the inner surface of one of the sidewalls in the vicinity of the reinforcement layer therein, the temperature of heat generated in one of the reinforcement layers that affect the limit of runflat operation can be detected more precisely by the tire temperature sensor; the runflat operation limit can be warned of by using data of the temperature, thereby enabling the driver to be given a warning against the runflat operation limit with high accuracy during runflat operation.

The present invention provides another tire alarm device that gives a warning against a runflat operation limit of a pneumatic tire supported during runflat operation by a runflat support member mounted on a rim of a wheel, comprising a tire temperature sensor to be disposed on a support region of the runflat support member that supports the pneumatic tire in contact therewith, the tire support sensor being used to warn of the runflat operation limit.

When the runflat support member is used, the tread of the pneumatic tire that persistently engages the runflat support member during runflat operation generates heat and is destroyed; as described above, by disposing the tire temperature sensor in the support region of the runlfat support member near the tread, the temperature of the tread generating heat during runflat operation can be detected more precisely by the tire temperature sensor, thereby enabling the driver to be given a warning against the runflat operation limit with high accuracy during runflat operation.

The present invention provides still another tire alarm device that gives a warning against a runflat operation limit of a pneumatic tire supported during runflat operation by a metallic support element of a runflat support member mounted on a rim of a wheel, comprising a tire temperature sensor to be disposed on the metallic support element, the tire support sensor being used to warn of the runflat operation limit.

In the case where the runflat support member having a metallic support element is used as described above, by disposing the tire temperature sensor on the metallic support element that is excellent in thermal conductivity, the temperature of the tread generating heat can be detected more precisely by the tire temperature sensor, thus enabling the driver to be given a warning against the runflat operation limit with high accuracy during runflat operation.

BEST MODES FOR CARRYING OUT THE INVENTION

Embodiments of the present invention will be described in detail below with reference to the attached drawings.

Figure 1:
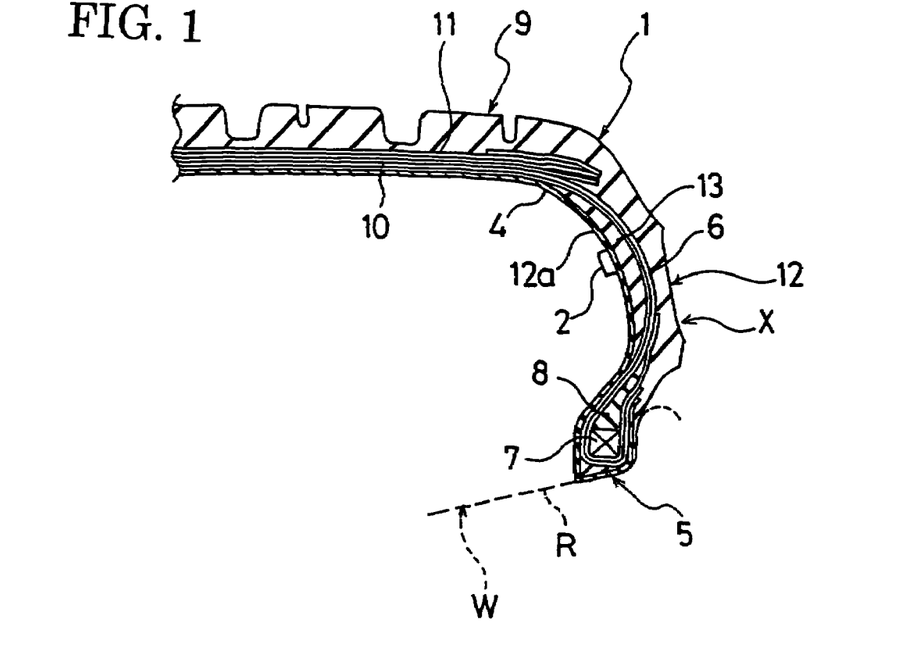
FIG. 1 is a main cross-sectional view showing a state where the tire side unit of a tire alarm device according to the present invention is attached to the inner surface of a sidewall facing the reinforcement layer therein.
Figure 2:
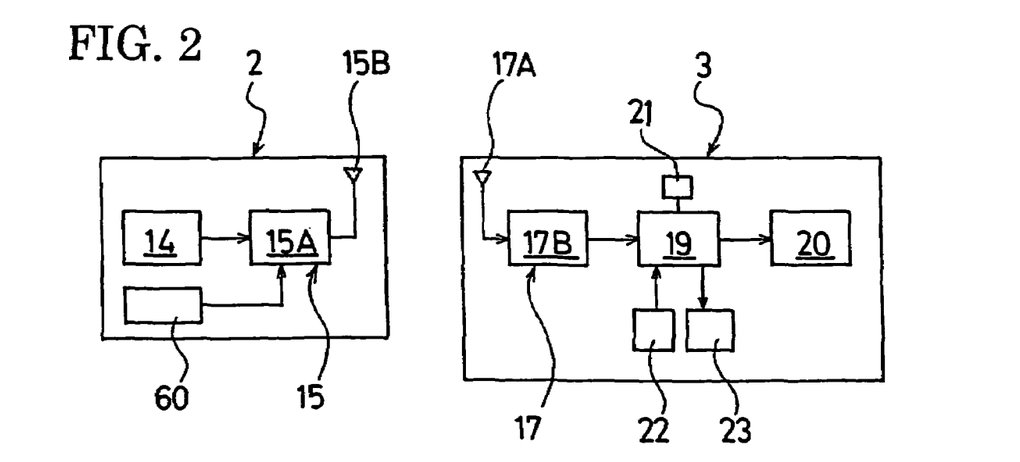
FIG. 2 is an explanatory drawing showing an embodiment of a tire alarm device according to the present invention.

Referring to FIGS. 1 and 2, reference numeral 1 denotes a pneumatic tire that can be operated in a runflat condition, reference numeral 2 denotes a tire side unit to be placed in a tire/wheel assembly X comprising a wheel W having a rim R and the pneumatic tire 1 mounted on the rim R, and reference numeral 3 denotes a vehicle side unit to be mounted on a vehicle.

The pneumatic tire 1 includes an innerliner 4 disposed on the inner side of the tire, and carcass plies 6 provided outwardly of the innerliner, the carcass plies extending between left and right beads 5. The carcass plies 6 each has opposite end portions that are folded from the inner side of the tire toward the outer side thereof about bead cores 7 embedded in the beads 5, with bead fillers 8 sandwiched therebetween.

Belt plies 10 are disposed radially outwardly of the carcass plies 6 in a tread 9, and a belt cover ply 11 is provided radially outwardly of the belt plies. Disposed between the innerlier 4 and the carcass plies 6 in each of sidewalls 12 is a cross-sectionally crescent-shaped reinforcement layer 13, formed of rubber, that allows for runfalt operation; by supporting the load with the reinforcement layers 13 during runflat operation, runflat operation is possible.

The tire side unit 2 comprises a tire temperature sensor 14 for detecting the temperature of the tire, a tire inner pressure sensor 60 for detecting pressure in the cavity of the pneumatic tire 1, and a transmitting means 15 for transmitting signals detected by the sensors 14 and 60 to the vehicle side unit 3. The transmitting means 15 has a transmitter 15A and an antenna 15B, and the detected signals are transmitted intermittently at prescribed intervals of time from the antenna 15B to the vehicle side unit 3.

The tire side unit 2 is attached to the inner surface region 12a of one of the sidewalls 12 facing the reinforcement layer 13 therein, so that the tire temperature sensor 14 is disposed in the vicinity of one of the reinforcement layers 13 that affect the limit of runflat operation.

The vehicle side unit 3 comprises a receiving means 17 having an antenna 17A that receives the detected signals transmitted from the antenna 15B and a receiver 17B, a processing means 19 that determines whether or not the tire has reached the zone of the run flat operation limit on the basis of the detected temperature signal, and a warning means 20 that informs the driver of the runflat operation limit if the processing means 19 determines that the tire has reached the runflat operation limit zone.

A memory 21 connected to the processing means 19 stores a preset limit temperature data corresponding to the runflat operation limit zone; the processing means 19 compares the value of temperature data of a signal detected by the tire temperature sensor 14 with the value of the limit temperature data stored in the memory 21, and if the temperature data value of the detected signal exceeds the limit temperature data value, the processing means 19 determines that the tire has reached the runflat operation limit zone, and outputs an operational signal to the warning means 20. The warning means 20 warns the driver of the runflat operation limit with a sound, light or the like when receiving the input of the operational signal. A clock means 22 that supplies time information data is connected to the processing means 19, and temperature data input to the memory 21 from the processing means 19 are stored as time history data of the temperature in the memory 21.

The processing means 19 also determines whether or not the value of pressure detected by the tire inner pressure sensor 60 is below a predetermined threshold value stored in the memory 21 in advance, and if the detected pressure value is less than the predetermined threshold value, the processing means determines that the tire is operated in a runflat condition. On the basis of this determination, the processing means determines whether or not the tire has reached the runflat operation limit zone according to the temperature data described above.

Figure 3:
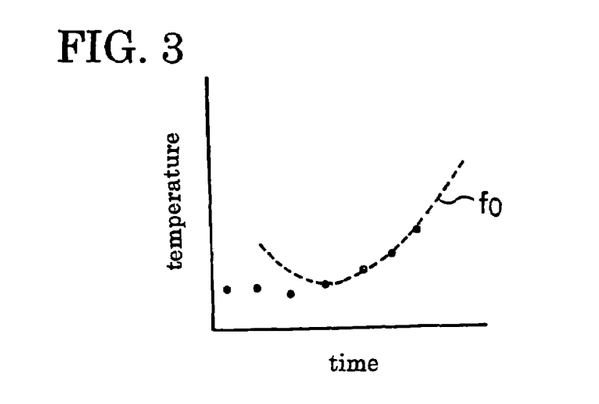
FIG. 3 is a graph showing an example of an approximate function $f_0$.

The processing means 19 further calculates a sectional approximate function $f_0$ of the time history data of the temperature by using at least four consecutive temperature data including the latest temperature data in the time history temperature data stored in the memory 21 if the data values of temperature signals detected by the tire temperature sensor 14 do not exceed the above limit temperature data value (see FIG. 3). Specifically, the approximate function $f_0$ used preferably includes a function having a quadratic or more polynomial such as $f_0=at^2+bt+c$ or $f_0=at^m+c$ where a, b, c and m are coefficients and t is time (second); each of the coefficients may be obtained by using a least-squares method or the like according to the function form. If the change of the temperature tends to increase or to be constant, that is, if the coefficient a is expressed by $a \geqq 0$ when using the above-mentioned function form, the temperature values after the latest temperature data are estimated in time series by an extrapolation method using the approximate function $f_0$, because the tire has a high possibility of reaching the runflat operation limit with the passage of time even if the tire has not reached the runflat operation limit at this time. A time interval reaching the limit temperature data value is calculated, based on the estimated temperature values, and the calculated time interval is displayed by a displaying means 23 connected to the processing means 19; the processing means estimates the time interval until the tire reaches the runflat operation limit zone to inform the driver. If the change of the temperature tends to decrease, that is, if the coefficient a is expressed by a<0 when using the above-mentioned function form, the processing means does not estimate the time interval until the tire reaches the runflat operation limit.

The value of the limit temperature data stored in the memory 21 is properly selected in accordance with tire sizes and constructions, and may generally be selected from the range of 50 to 150° C. The reason why at least four consecutive temperature data including the latest temperature data are employed is to capture the extreme changing of the temperature more properly. Preferably, six consecutive temperature data including the latest temperature data are used.

When the reinforcement layers 13 that support the load during runflat operation are destroyed, the pneumatic tire 1 described above does not allow for runflat operation; in the process of reaching the destruction, the reinforcement layers 13 are repeatedly significantly deformed, so the amount of heat generated therein is much greater, resulting in that the temperature thereof rises to a greater extent than that of other parts. As the temperature is higher, the degree of risk of becoming the runflat operation limit is higher.

In the present invention, based on the knowledge, the tire side unit 2 having a tire temperature sensor 14 is placed in the inner surface region 12a of one of the sidewalls 12 in the vicinity of the reinforcement layer 13 therein, so that the temperature of heat generated in the reinforcement layers 13 can be detected more precisely by the tire temperature sensor 14 as the temperature of the tire, and the runflat operation limit can be determined by the processing means 19 using the temperature data, thereby being possible to give the driver a warning against the runflat operation limit with high accuracy during runflat operation.

If the data values of temperature signals detected by the tire temperature sensor 14 do not exceed the limit temperature data value, the time interval reaching the runflat operation limit zone can be estimated, thereby informing the driver of the runflat operation limit in advance and allowing for the provision of information on the tire exchange time.

Figure 4:
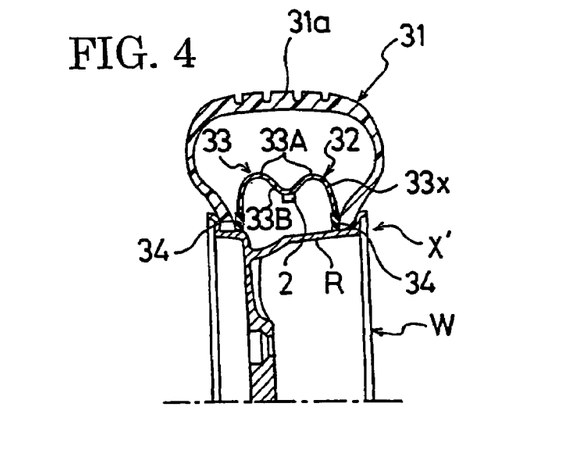
FIG. 4 is a main cross-sectional view showing an example of the tire side unit of a tire alarm device according to the present invention that is attached to the runflat support member.

Referring to FIG. 4, the tire alarm device of the present invention described above is used for a tire/wheel assembly X' comprising a wheel W having a rim R, a pneumatic tire 31, and a runflat support member 32 mounted on the rim for supporting the pneumatic tire during runflat operation. The pneumatic tire 31 has a normal construction without the reinforcement layers 13 described above.

The runflat support member 32 comprises an annular shell 33 formed of a rigid material such as metal or resin, and left and right elastic rings 34 formed of an elastic material such as elastic resin. When the tire/wheel assembly X' is mounted on a vehicle and the pneumatic tire 31 is punctured during traveling, the tread 31a of the punctured pneumatic tire 31 is supported by the radially outer support region 33X of the annular shell 33, which allows for runflat operation.

In a tire/wheel assembly X' as described above, the tread 31a that persistently engages the annular shell 33 during runflat operation generates heat and is destroyed, whereby runflat operation can not be performed. Therefore, the tire side unit 2 is disposed in the support region 33X of the annular shell 33 that supports the tread 31a in engagement therewith. In the example shown in the drawing, the support region 33X of the annular shell 33 comprises two convex support portions 33A arranged in the widthwise direction of the shell and a concave connection portion 33B connecting the two convex support portions 33A, and the tire side unit 2 is attached to the inner surface of the concave connection portion 33B.

Figure 5A:
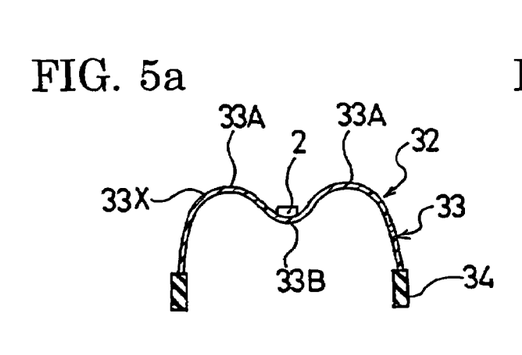
FIGS. 5a and 5b are main cross-sectional views showing other examples of the tire side unit that is attached to the runflat support member shown in FIG. 4, respectively.
Figure 5B:
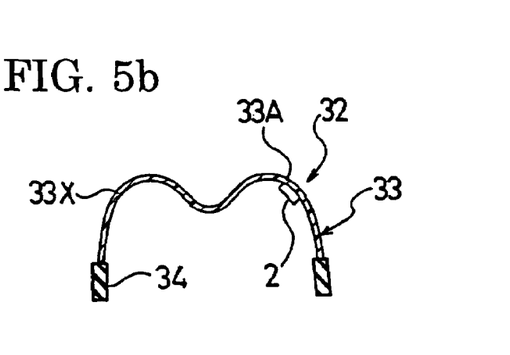

The tire side unit 2 maybe attached to the outer surface of the concave connection portion 33B as shown in FIG. 5a, or may be placed on the inner surface of one of the convex support portions 33A as shown in FIG. 5b.

Figure 6A:
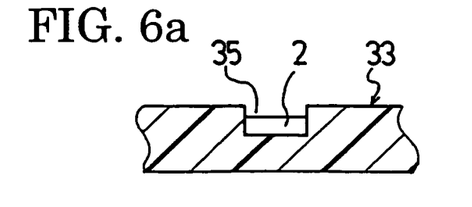
FIGS. 6a and 6b are main enlarged cross-sectional views showing still other examples of the tire side unit that is attached to the runflat support member shown in FIG. 4, respectively.
Figure 6B:
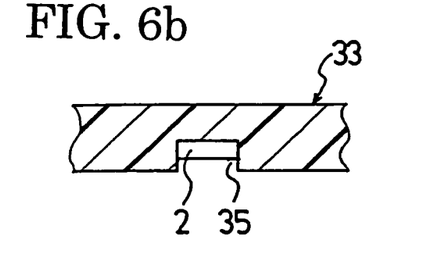

The tire side unit 2 may further be placed in a recess 35 formed in the outer surface of the annular shell 33 as shown in FIG. 6a, or may be disposed in a recess 35 formed in the inner surface of the annular shell 33 as shown in FIG. 6b. By putting the tire side unit 2 in the recess 35 as described above, the tire side unit 2 can be attached to the outer surface of the convex end of the convex support portion 33A of the support region 33X, and placed in a position extremely close to the tread 31a that generates heat during runflat operation.

Figure 7:
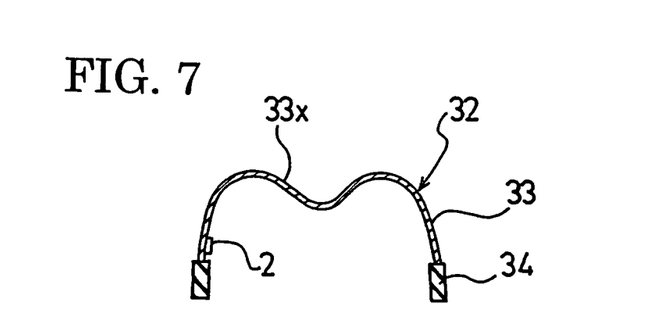
FIG. 7 is a main cross-sectional view showing an example of the tire side unit that is attached to the metallic support element of a runflat support member.

When the annular shell 33 is composed of a metallic support element, the tire side unit 2 may be placed in any position of the annular shell 33 such as in the surface of the annular shell 33 that is out of the support region 33X and is in the vicinity of one of the elastic rings 34 as shown in FIG. 7 for example, if the tire side unit 2 is not broken, because the annular shell is very good in thermal conductivity.

As described above, the tire alarm device of the present invention can also be preferably used for a tire/wheel assembly X' in which the runflat support member 32 for supporting the pneumatic tire 31 during runflat operation is mounted on the rim R.

The runflat support member 32 is not limited to one having the above-described structure, but may be a runflat support member comprising, for example, a T-shaped or I-shaped insert ring or the like attached to the rim R.

Figure 8:
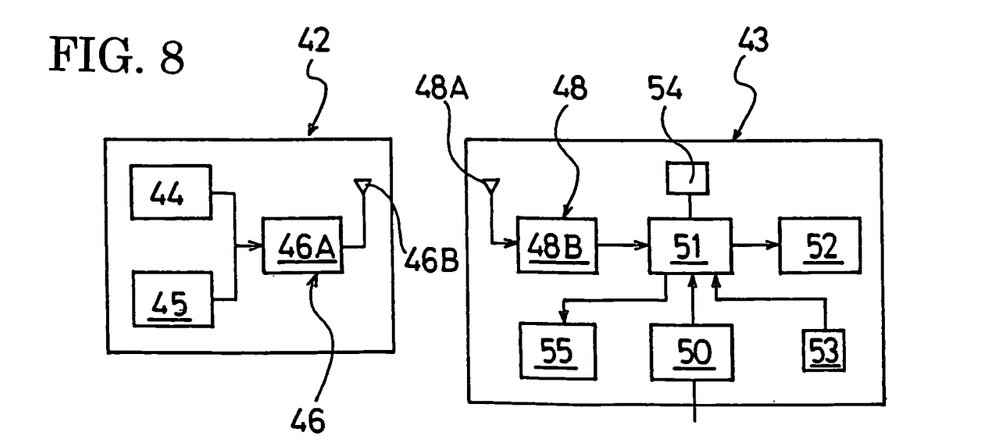
FIG. 8 is an explanatory drawing showing another embodiment of a tire alarm device according to the present invention.

Referring to FIG. 8, there is shown another embodiment of the tire alarm device of the present invention, in which reference numeral 42 is a tire side unit to be disposed in the tire/wheel assembly X, X' and reference numeral 43 is a vehicle side unit to be mounted on a vehicle.

The tire side unit 42, which is attached to the same position as described above, comprises a tire temperature sensor 44 for detecting the tire temperature, a tire inner pressure sensor 45 for detecting pressure in the cavity of the pneumatic tire, and a transmitting means 46 for transmitting signals detected by the tire temperature sensor 44 and the tire inner pressure sensor 45 to the vehicle side unit 43. The transmitting means 46 has a transmitter 46A and an antenna 46B, and the detected signals are transmitted intermittently at prescribed intervals of time from the antenna 46B to the vehicle side unit 43.

The vehicle side unit 43 comprises a receiving means 48 having an antenna 48A that receives the detected signals transmitted from the antenna 46B and a receiver 48B, a speed obtaining means 50 for obtaining the running speed of the vehicle from the vehicle, a processing means 51 that determines whether or not the tire has reached the runflat operation limit zone on the basis of the detected signals of the tire temperature and tire inner pressure input from the receiving means 48, and the detected signals from the speed obtaining means 50, a warning means 52 that informs the driver of the runflat operation limit if the processing means 19 determines that the tire has reached the runflat operation limit zone, a clock means for supplying time information data to the processing means 51, and a memory 54.

The memory 54, which is connected to the processing means 54, stores data of the pressure, speed, and temperature output from the processing means 51 as time history data.

Figure 10:
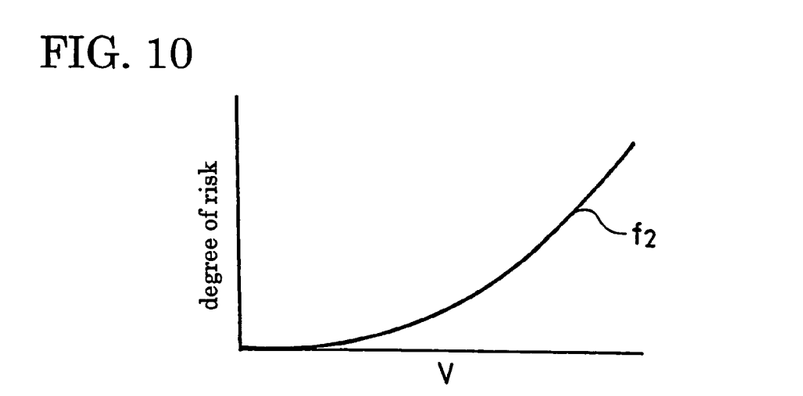
FIG. 10 is a graph showing an evaluation function $f_2$ for evaluating the degree of risk according to the running speed of the vehicle.
Figure 11:
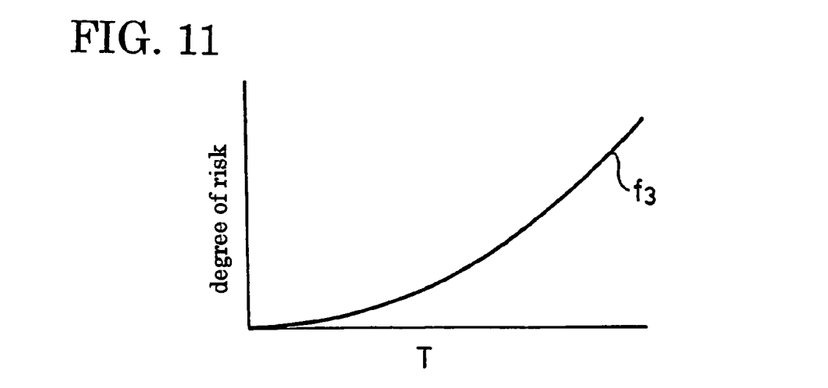
FIG. 11 is a graph showing an evaluation function $f_3$ for evaluating the degree of risk according to the temperature of the tire.

An evaluation function $f_1$ for evaluating the degree of risk according to the tire inner pressure, an evaluation function $f_2$ for evaluating the degree of risk according to the vehicle running speed, and an evaluation function $f_3$ for evaluating the degree of risk according to the tire temperature are stored in the memory 54. These evaluation functions are obtained from experiments; examples of the evaluation functions are shown in FIGS. 9, 10 and 11.

Figure 9:
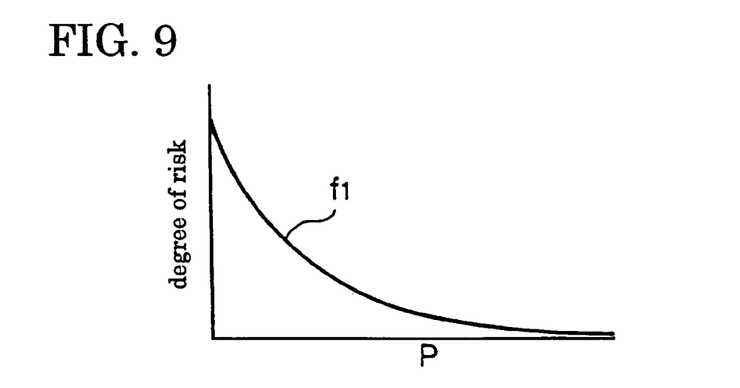
FIG. 9 is a graph showing an evaluation function $f_1$ for evaluating the degree of risk according to the inner pressure of the tire.

FIG. 9 shows the evaluation function $f_1$ for evaluating the degree of risk according to the tire inner pressure, and this evaluation function $f_1$ is expressed with a form that decreases monotonously as the inner pressure increases as follows:

$$f_1 = a_1 \times e^{-C1 \times P}$$

where $a_1$ is a constant that is a positive real value, C1 is a constant, P is the ratio of the real air pressure of the tire (kPa) to the set air pressure of the tire (kPa), and e is the natural logarithm. The constant $a_1$ is preferably in the range of $10^{-1}$ to $10^1$, and the constant C1 in the range of 2.0 to 8.0. The constants $a_1$ and C1 are values that depend on the size and construction of the tire and the like. The value detected by the tire inner pressure sensor 45 is used for the real air pressure of the tire. In the graph of FIG. 9, the ratio P of the real air pressure of the tire to the set air pressure of the tire is plotted along the abscissa, and the degree of risk along the ordinate.

FIG. 10 shows the evaluation function $f_2$ for evaluating the degree of risk according to the vehicle running speed, and this evaluation function $f_2$ is expressed with a form that increases monotonously as the vehicle running speed increases as follows:

$$f_2 = a_2 \times V^{C2}$$

where $a_2$ is a constant that is a positive real value, C2 is a constant, and V is the ratio of the running speed of the vehicle (km/h) to the reference speed (100 km/h). The constant $a_2$ is preferably in the range of $10^{-1}$ to $10^1$, and the constant C2 in the range of 1.5 to 3.5. The constants $a_2$ and C2 are also values that depend on the size and construction of the tire and the like. The value obtained by the speed obtaining means 50 is used for the vehicle running speed. In the graph of FIG. 10, the ratio V is plotted along the abscissa, and the degree of risk along the ordinate.

FIG. 11 shows the evaluation function $f_3$ for evaluating the degree of risk according to the tire temperature, and this evaluation function $f_3$ is expressed with a form that increases monotonously as the temperature increases as follows:

$$f_3 = a_3 \times T^{C3}$$

where $a_3$ is a constant that is a positive real value, C3 is a constant, and T is the ratio of the tire temperature (° C.) to the reference temperature (25° C.). The constant $a_3$ is preferably in the range of 4 to 256, and the constant C3 in the range of 1 to 4. The constants $a_3$ and C3 are also values that depend on the size and construction of the tire and the like. The value detected by the tire temperature sensor 44 is used for the tire temperature. In the graph of FIG. 11, the ratio T is plotted along the abscissa, and the degree of risk along the ordinate.

Figure 12:
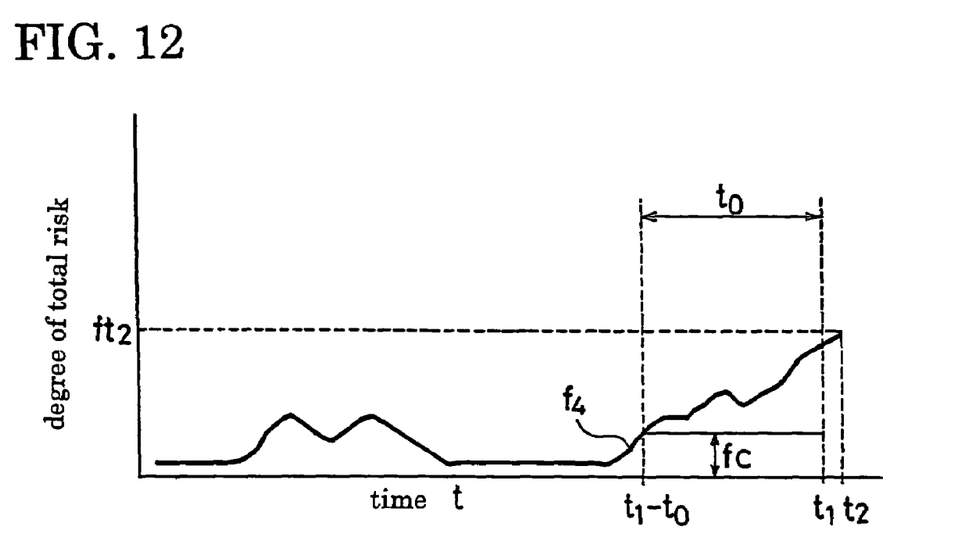
FIG. 12 is a graph showing an example of a total evaluation function $f_4$.

The processing means 51 combines the above evaluation functions $f_1$, $f_2$ and $f_3$ to form an expression shown by the following expression, which is a total evaluation function f4 for evaluating the degree of total risk. FIG. 12 shows a graph of an example of the total evaluation function. Time t is plotted along the abscissa, and the degree of total risk along the ordinate.

$$f_4 = m_1 \times a_1 \times e^{-C1 \times P_t} + m_2 \times a_2 \times V_t^{C2} + m_3 \times a_3 \times T_t^{c3}$$

In the expression, $m_1$ to $m_3$ are weighting coefficients, and the coefficients $m_1$ to $m_3$ are normally 1; however, when the degree of contribution to the inner pressure, speed, and temperature differs due to the tire size and construction and the like, the coefficients $m_1$ to $m_3$ are properly modified accordingly. In this case, the coefficients $m_1$ to $m_3$ may generally be selected from the range of 1 to 10. $P_t$, $V_t$ and $T_t$ are values obtained by the tire inner pressure sensor 45, speed obtaining means 50 and tire temperature sensor 44 according to time, respectively.

Next, the processing means calculates the temporal integration value $F_{t-t1}$ of an interval between the time $t_1$ of the data just one before the data having the latest time $t_2$ and the time $t_1-t_0$ that goes back a time period $t_o$ from the time $t_1$, using the total evaluation function $f_4$, as shown in the expression below. The time period $t_0$ is preferably in the range of time such that, in data obtained intermittently from the tire side unit 42, the number of data in the integral interval is about 5 to 100. When the data are obtained at five second intervals, for example, the time period may be in the range of about 25 to 500 seconds. If the time period $t_0$ is too short or long, a proper estimate can not be done. In particular, if the time period is too long, there is a risk that a proper estimate can not be done when the temperature changes quickly.

$$F_{t=t1} = \int_{t_1-t_0}^{t_1} f_4 dt$$

The processing means further calculates a reference value $f_c$ used for determination of the runflat operation limit from the integration value $F_{t=t1}$, using the following expression.

$$F_c = F_{t=t1}/t_0$$

Then, if the following expression is fulfilled, using the value $f_{t2}$ of the total evaluation function $f_4$ at the latest time $t_2$, reference value $f_c$ and limit value L stored in the memory 54 in advance, the processing means determines that the tire has reached the runflat limit zone, and the warning means 52 gives the driver a warning against the runflat operation limit.

$$f_{t2}/f_c > L$$

When a tire has reinforcement layers 13, the limit value L depends on the thickness, properties, etc. of the reinforcement layers 13, and when a tire has no reinforcement layers 13 and the runflat support member 32 is used, the limit value L depends on the material, thickness, shape, etc. of the annular shell 33 of the runflat support member 32 as well as the material, thickness, shape, etc. of the elastic rings 34; the limit value is properly set in the range of 2 to 5.

The values of the total evaluation function $f_4$ that have been calculated sequentially are serially input from the processing means 51 to the memory 54, and stored as time history data.

The processing means 51 also determines whether or not the values of the pressure detected by the tire inner pressure sensor 45 are below a prescribed threshold value prestored in the memory 54, and if the detected pressure values are less than the prescribed threshold value, the processing means determines that the tire is operated in a runflat condition. If the processing means determines that the tire is operated in the runflat condition, the processing means determines whether or not the tire has reached the above runflat limit zone.

The processing means 51 further calculates a sectional approximate function $f'_4$ of the total evaluation function $f_4$ by using at least four consecutive data including the latest data in the time history data of the values of the total evaluation function $f_4$ stored in the memory 21 if the processing means 51 determines that the latest data does not exceed the limit value of the degree of risk; the processing means then estimates the values of the total evaluation function $f_4$ after the latest data in time series by an extrapolation method using the sectional approximate function $f'_4$. The approximate function $f'_4$ used preferably includes a function having a quadratic or more polynomial such as $f'_4 = Ax^2 + Bx + C$ or $f'_4 = Ax^n + C$ where A, B, C and n are coefficients and x is time (second); each of the coefficients may be obtained by using a least-squares method or the like according to the function form.

The processing means 51 calculates a time interval until the tire reaches the runflat operation limit zone, using the values estimated in time series and the limit value L, and the calculated time interval is displayed by the display means 55 connected to the processing means 51; the time interval until the tire reaches the runflat operation limit zone can be projected.

The present inventor has found the following through an intense study and various experiments about the limit as to the runflat operation.

As the tire inner pressure is lower, the degree of risk of becoming the runflat operation limit is higher; as the running speed of a vehicle is faster, the degree of risk of becoming the runflat operation limit is greater; as the tire temperature is higher, the degree of risk of becoming the runflat operation limit is further increased; it has been found that evaluation functions $f_1$, $f_2$ and $f_3$ that evaluate the degree of risk described above are expressed by expressions that change in a nonlinear manner as explained above.

These evaluation functions $f_1$, $f_2$ and $f_3$ are correlative to each other, and can be connected as the total evaluation function $f_4$ having variables according to time as described above; by determining the runflat operation limit as described above on the basis of the temporal integration value $F_{t=t1}$ and the preset limit value, the runflat operation limit can be determined with high accuracy during runflat operation.

The above-described total evaluation function $f_4$ is defined by the sum of the functions $f_1$, $f_2$ and $f_3$ multiplied by the weighting coefficients, respectively, but the total evaluation function $f_4$ may be expressed as follows.

$$f_4 = a_1 \times e^{-C1 \times Pt \times m1} + a_2 \times V_t^{C2 \times m2} + a_3 \times T_t^{C3 \times m3}$$

The limit value L used here is modified to be a value according to the expression.

As described above, according to the another embodiment of the present invention, the processing means determines whether or not the tire has reached the runflat operation limit zone on the basis of the temporal integration value of the total evaluation function $f_4$ and the preset limit value L, thereby enabling the driver to be given a warning against the runflat operation limit with higher accuracy during runflat operation.

Since the time interval until the tire reaches the runflat operation limit zone can be estimated, the driver can be informed of the runflat operation limit in advance and provided with information on the tire exchange time.

In the present invention, the tire side unit 42 may separately be structured so as to have a unit including the tire temperature sensor 44 and a unit including the tire inner pressure sensor 45; the unit including the tire temperature sensor 44 is attached in the vicinity of the high-heat generation region as described above while the unit including the tire inner pressure sensor 45 is placed on the rim R or the like.

The processing means 51 is preferably structured so that the processing means makes the memory 54 store data of the tire inner pressure, running speed and tire temperature as respective mapped data at the initial stage of the tire when the tire is run up to about 1000 km after the tire inner pressure is set to a vehicle's recommended air pressure (air pressure indicated in a vehicle, or air pressure stated in JATMA (year 2002) if not indicated in the vehicle) at the point of purchase of a new vehicle or at the point of tire exchange, and calculates means values of the respective mapped data as respective reference data of the tire inner pressure, running speed and tire temperature, and compares the reference data with data of the tire inner pressure, running speed and tire temperature obtained during traveling after the tire initial stage to calculate the amount of deviations from the reference data. This allows the condition of the tire to be easily verified during normal operation after the tire initial stage.

While preferred embodiments of the tire alarm device has hereinabove been described, it will be understood that the present invention is not limited to the above embodiments but covers all modifications as may be included within the scope of the invention as defined by the appended claims.

INDUSTRIAL APPLICABILITY

The tire alarm device of the present invention having the aforementioned excellent effects can be very effectively utilized as a tire alarming device that gives a warning against the runflat operation limit of a pneumatic tire during runfalt operation.

What is claimed is:

1. A tire alarm device that gives a warning against a runflat operation limit of a pneumatic tire during runflat operation having a reinforcement layer disposed in each sidewall thereof for enabling the run flat operation, comprising:
   a tire temperature sensor disposed on an inner surface of one of the sidewalls facing the reinforcement layer therein, the tire temperature sensor being used to warn of the runtlat operation limit,
   a processing means that determines whether or not the tire has reached a zone of the runflat operation limit based on a signal detected by the temperature sensor;
   a warning means that gives a warning if the processing means determines that the tire has reached the runflat operation limit zone;
   a tire side unit having the tire temperature sensor; and
   a transmitting means that transmits the signal detected by the tire temperature sensor, and a vehicle side unit having a receiving means that receives the signal from the transmitting means, the processing means and the warning means,
   wherein the vehicle side unit has a memory that stores a preset limit temperature data according to the runflat operation limit zone, and wherein the processing means compares a temperature data value of the signal detected by the tire temperature sensor with a value of the limit temperature data, and determines that the tire has reached the runflat operation limit zone if the temperature data value of the detected signal exceeds the limit temperature data value,
   wherein the tire side unit has a tire inner pressure sensor for detecting pressure in a cavity of the pneumatic tire, and wherein the processing means determines whether or not a value of the pressure detected by the tire inner pressure sensor is below a prescribed threshold value, and determines that the tire is operated in a runflat condition if the detected pressure value is less than the prescribed threshold value, and determines whether or not the tire has reached the runflat operation limit zone if the processing means determines that the tire is operated in the runflat condition, and
   wherein the memory stores time history data of the temperature detected, and wherein the processing means calculates a sectional approximate function of the temperature time history data by using at least four consecutive temperature data including a latest temperature data in the temperature time history data stored in the memory if the processing means determines that the tire has not reached the runflat operation limit zone, and estimates values of the temperature after the latest temperature data in time series by an extrapolation method using the sectional approximate function, and calculates a time interval reaching the limit temperature data value on the basis of the estimated temperature values.

2. A tire alarm device that gives a warning against a runflat operation limit of a pneumatic tire during runflat operation having a reinforcement layer disposed in each sidewall thereof for enabling the runflat operation, comprising:

a tire temperature sensor disposed on an inner surface of one of the sidewalls facing the reinforcement layer therein, the tire temperature sensor being used to warn of the runflat operation limit;

a tire inner pressure sensor for detecting pressure in a cavity of the pneumatic tire;

a speed obtaining means for obtaining a running speed of a vehicle on which the pneumatic tire is mounted;

a processing means that determines whether or not the tire has reached a zone of the runflat operation limit based on signals from the tire temperature sensor, the tire inner pressure sensor and the speed obtaining means; and a warning means that gives a warning if the processing means determines that the tire has reached the runflat operation limit zone, wherein the processing means calculates a temporal integration value obtained by integrating by time a total evaluation function $f_4$ that is a combination of an evaluation function $f_1$ for evaluating degree of risk according to the tire inner pressure, an evaluation function $f_2$ for evaluating degree of risk according to the vehicle running speed and an evaluation function $f_3$ for evaluating degree of risk according to the tire temperature and has variables according to time, and determines whether or not the tire has reached the runflat operation limit zone based on the temporal integration value and a preset limit value L.

3. A tire alarm device according to claim 2, comprising a memory storing the preset limit value L, the processing means comparing the temporal integration value with the preset limit value L and determining that the tire has reached the run flat operation limit zone if the temporal integration value exceeds the preset limit value L.

4. A tire alarm device according to claim 3, wherein the processing means determines whether or not a value of the pressure detected by the tire inner pressure sensor is below a prescribed threshold value, and determines that the tire is operated in a runflat condition if the detected pressure value is less than the prescribed threshold value, and determines whether or not the tire has reached the runflat operation limit zone if the processing means determines that the tire is operated in the runflat condition.

5. A tire alarm device according to claim 4, wherein the memory stores values of the total evaluation function $f_4$ as time history data, and wherein, if the processing means determines that the tire has not reached the runflat operation limit zone, the processing means calculates a sectional approximate function $f'_4$ of the total evaluation function $f_4$ by using at least four consecutive data including a latest data in the time history data of the values of the total evaluation function $f_4$ stored in the memory, and estimates values of the total evaluation function $f_4$ after the latest data in time series by an extrapolation method using the sectional approximate function $f'_4$, and calculates a time interval until the tire reaches the run hat operation limit zone, using the values estimated in time series and the limit value L.

6. A tire alarm device according to claim 2, comprising a tire side unit having the tire temperature sensor, the tire inner pressure sensor and a transmitting means that transmits the signals detected by the tire temperature sensor and the tire inner pressure sensor, and a vehicle side unit having a receiving means that receives the signals from the transmitting means, the processing means and the warning means.

* * * * *